United States Patent Office 3,317,635
Patented May 2, 1967

3,317,635
POLYMERIC DISPERSION STABILIZERS FOR DISPERSIONS OF SYNTHETIC POLYMERS IN ORGANIC LIQUIDS
Desmond Wilfrid John Osmond, Iver Heath, England, assignor to Imperial Chemical Industries Limited, London, England, a corporation of Great Britain
No Drawing. Filed June 24, 1963, Ser. No. 290,243
Claims priority, application Great Britain, May 27, 1957, 16,697/57; May 1, 1959, 15,051/59
40 Claims. (Cl. 260—881)

This is a continuation-in-part of earlier application Ser. No. 212,469, filed July 25, 1962, now abandoned, the said application in turn being a continuation-in-part of earlier copending application Ser. No. 848,923, filed Oct. 27, 1959, now abandoned.

This invention relates to new stabilizers for use in dispersions of synthetic polymers in organic liquids, to new processes of making such stabilizers and to dispersions of synthetic polymers in organic liquids stabilized therewith.

We have found that dispersions of synthetic polymers in organic liquids can be stabilized by incorporating in the disperse polymer particles a block or graft copolymer in which one polymeric chain is solvated by the organic liquid and another polymeric chain is solvated by the organic liquid and another polymeric chain is non-solvated by the organic liquid and is associated integrally with the insoluble disperse polymer.

In this way the solvated constituents of the copolymer which provide the stabilizing effect are attached by primary chemical bonds to molecules forming an integral part of the particles. This is in contrast to the use of conventional stabilizing agents in which the stabilizing solvated groups become indirectly attached to the disperse particles through groups which are themselves merely adsorbed on to the surface of the disperse particles by second order forces.

The solvated polymeric chain may be derived from natural rubber, which preferably has been degraded, and the block or graft copolymer may be made by building another polymer chain thereon by copolymerisation with a vinyl monomer. The dispersion is made by forming the synthetic polymer particles in the organic liquid in the presence of the block or graft copolymer.

The polymer particles may be formed and stabilized by polymerising monomer in the organic liquid in which the polymeric constituent solvated by the organic liquid is dissolved. In such a process, a major part of the monomer is polymerised to form polymer which, being insoluble in the organic liquid, forms disperse particles in the liquid. At the same time, part of the monomer copolymerises with the solvated polymeric constituent to form a block or graft copolymer which serves to stabilize the disperse polymer particles.

However, where the solvated constituent is rubber and the monomer is vinyl monomer the production of stabilizer by block or graft copolymerization with the rubber proceeds by a side reaction resulting from haphazard activation of a point or points in the rubber molecule by the polymerization initiator. Such a copolymerization is difficult to control, particularly when trying to produce selected types of stable dispersions.

Following the common practice in the art, the term "vinyl monomer" is intended to include ethylenically unsaturated monomers which, though not of vinyl structure in the strict sense, polymerize in vinyl manner. For example, monomers which strictly are vinylidene or ethylenic monomers, but which polymerize in vinyl manner are included, as are doubly unsaturated monomers such as butadiene.

According to the present invention a stabilizer not based on rubber, but suitable for use in dispersions of synthetic polymer in organic liquid, is a block or graft copolymer of ethylenically unsaturated monomer with a precursor containing a polymeric chain and an unsaturated group with which the monomer polymerises in vinyl-type manner to produce a polymeric vinyl chain of different degree of polarity from that of the original polymeric chain.

The solvated groups in conventional stabilizing agents commonly comprise a chain of about 10 carbon atoms, i.e. their molecular weight is about 250. While solvated groups of such size may in some cases be used to stabilize the dispersion of the present invention, we prefer to use solvated constituents of at least 1,000 molecular weight, the advantages of which are explained hereinafter.

The molecular weight of both chains of the stabilizer may range from 1,000 to $10^6$ or more. Preferably, however, the molecular weight of one polymeric chain is at least 2,000 and in the range 0.1 to 10 times the molecular weight of the other polymeric chain, which is at least 5,000 and preferably at least 10,000.

In this specification molecular weight is expressed as the viscosity average.

Where, as is preferred, the original polymeric group of the precursor is one prepared by vinyl-type polymerization, the stabilizer will contain two types of polymeric chains prepared by vinyl-type polymerization. However, as stated above, these two types of polymeric chains must be of different degrees of polarity so that when the stabilizer is used in a polymer dispersion in organic liquid, one type of chain is solvated by the organic liquid and the other is non-solvated by the organic liquid, as is the synthetic polymer which is insoluble in the organic liquid in which it is dispersed. This difference of polarity is, of course, equally necessary in those cases where the original polymeric chain is of a non-vinyl type, for example, where it is a naturally-occurring polymer or a condensation polymer. It is believed that the stabilizer functions by the non-solvated chains becoming associated with the disperse particles of polymer, the solvated chains of the stabilizer then serving to stabilize the particles to which they are attached. It is that polymeric chain of the stabilizer which is to be solvated which preferably should have the molecular weight of at least 5,000, or better still at least 10,000; the other type of chain which is to be non-solvated should have a molecular weight which is preferably at least 2,000, but is not less than a tenth or greater than ten times the molecular weight of the solvated chain, preferably from 0.2–1.5 times.

Stable dispersions of synthetic polymers in organic liquid may be made by precipitating the polymer in the organic liquid in the presence of a stabilizer of this invention of which one polymeric chain is solvated by the organic liquid and another is non-solvated and consequently becomes associated with the non-solvated polymer.

In one important embodiment of the invention the dispersion is made by polymerizing monomer in the organic liquid in the presence of the stabilizer to form the insoluble synthetic polymer.

In a further preferred embodiment of the invention dispersions of polymer are made by polymerizing ethylenically unsaturated monomer in solution in an organic liquid in which the polymer is insoluble in the presence of a precursor containing a polymeric chain solvated by the organic liquid and an unsaturated group attached by a primary chemical bond to said solvated chain and which copolymerizes with the monomer in vinyl-type manner to produce polymer chains which become an integral part of the disperse polymer particles when the polymeric product precipitates in the organic liquid.

In this preferred embodiment of the invention a major part of the monomer is polymerized to a polymer which is insoluble in the organic liquid and forms disperse particles therein which are stabilized by graft copolymer formed by copolymerizing in vinyl-type manner a minor part of the monomer with the unsaturated group of the precursor to form vinyl chains. These vinyl chains are of a different degree of polarity to the solvated chains of the precursor in that, like the polymeric chains of the disperse polymer, which are formed by the same monomer, they are insoluble in, i.e. are not solvated by, the organic liquid of the dispersion. Consequently, these chains become associated with the like chains of the disperse polymer particles and serve to attach the solvated chains of the graft copolymer to the particles.

The compound containing the polymeric chain and the unsaturated group, which compound is, for convenience, referred to as the precursor of the stabilizer, is preferably made by a condensation reaction which links together the said chain and group.

Suitable condensation reactions by which the unsaturated group may be attached to the polymeric chain to form the stabiliser precursor include those which result in ester, ether, amide, urethane and other links. Such condensation reactions involve a reactive group in the polymeric chain and a complementary reactive group attached to the unsaturated group.

Usually one would prefer to have only a very small proportion of esterifiable or other reactive groups in the polymeric chain and then to attach unsaturated groups to substantially each of these to produce, in the stabilizer precursor, an average of at least one unsaturated group for each polymeric chain. Usually, however, the esterification or other linking reaction proceeds slowly in the end-stage and any attempt to force this reaction to completion may result in destruction of a significant number of the unsaturated double bonds. Consequently, this invention provides an improved process of preparing new and more useful stabilizer precursors by providing in a polymeric chain an excess of esterifiable or other reactive groups capable of entering into a condensation reaction so that when unsaturated groups are linked onto only a proportion of these it is still possible to produce a desired selected precursor containing on average at least one unsaturated group per molecule.

The appropriate excess of reactive groups to be used will depend on the absolute concentrations of the reactive groups in the condensation reaction mixture. Bearing in mind the fact that one of the complementary reactive groups of the pair will be attached to a polymeric chain of molecular weight at least 1,000 or 5,000, and quite possibly 50,000 or more, it will be realised that the absolute concentration in the reaction mixture of the reactive group itself will usually be very small, e.g. at most a few percent and quite possibly as little as 0.1% or less. In order that the required number of groups may be reacted in a reasonable time, the excess of reactive groups used may conveniently range from 10% when the molecular weight of the polymeric chain is 2,000 through 100% when the molecular weight of the polymeric chain is 50,000 to 600% when the molecular weight of the polymeric chain is 500,000. These figures are merely rough guides. The excess used may be varied according to the vigour of the particular condensation reaction and the time in which the desired degree of reaction is to be completed.

A preferred way of introducing an excess of appropriate reactive groups into the polymeric chain is to prepare the chain by vinyl polymerisation of a monomer containing such a reactive group. For example, when a homopolymer is prepared from such a monomer it will have a large excess of the groups. Alternatively, where the reactive groups are introduced into the polymeric chain by random copolymerization using a minor proportion of the monomer containing such a reactive group, the number of reactive groups in each polymeric solvatable chain may be controlled by controlling the proportion of the minor monomer used. From this point of view the co-monomer used to introduce the reactive group should not be one which merely terminates growing polymer chains for in this case only one reactive group can be introduced into the polymeric chain. Clearly, in this case the preferred excess of reactive groups cannot be provided.

In another embodiment of the invention, the stabiliser precursor containing the polymeric chain and the unsaturated group is prepared by condensation polymerization. For example, alkylene oxides can be polymerized from polyols to form polyethers with esterifiable hydroxyl groups to which the unsaturated groups may be linked by a condensation reaction.

In another embodiment of the invention, the polymeric chain of the stabilizer precursor, is, or is derived from, a naturally-occurring polymeric material. For example, cellulose, being a relatively polar material, is solvatable by polar organic liquids and already contains hydroxyl groups which can take part in the condensation reaction by which the unsaturated group is linked to it. Rubber, on the other hand, is a relatively non-polar material and is solvatable by organic liquids of similar polarity. Groups capable of taking part in a condensation reaction may be introduced into it, e.g. by reacting it with maleic anhydride, thus introducing an acid anhydride group. The molecular weight of such naturally-occurring polymeric materials may be reduced if desired by a degradation process.

Additionally then, we have now found that stabilizers suitable for use in dispersions of synthetic polymers in organic liquids may be made by reacting by a condensation reaction a compound containing a polymeric chain and at least one group capable of such a reaction per molecule with a compound containing both a complementary reactive group and an unsaturated group to produce a stabiliser precursor containing at least one unsaturated group per molecule, the precursor then being copolymerised with an ethylenically unsaturated monomer to produce a "vinyl" chain of different polarity to that of the original polymeric chain.

Preferably not more than an average two "vinyl" chains per molecule are built on to the precursor to form the stabiliser.

The unsaturated group of the precursor may be, for example, an unsaturated acid, alcohol or amide such as acrylic acid, methacrylic acid, allyl alcohol, glycidyl methacrylate and methacrylamide, i.e. groups which copolymerize with the ethylenically unsaturated monomer by vinyl-type polymerization.

Further, we have found it easier to make the preferred stabilizers if the reactivity ratios of the ethylenically unsaturated monomer and the unsaturated group of the stabilizer precursor are approximately unity, that is to say, a polymer chain having at its growing end a radical derived from the monomer or the unsaturated group should react just as readily with precursor as with the monomer. If the reactivity ratio differs from unity, say by a factor of 10, then either the stabilizer precursor will be used up in the early stages and so it will be desirable to add stabilizer precursor during the course of the copolymerization, or it will become necessary to use stabilizer precursor containing a much larger number, say 10 or more, unsaturated groups per molecule in order to improve the rate of copolymerization of the precursor.

The ideal situation is one in which the unsaturated groups of the stabilizer precursor and of the monomer are of the same chemical type in which case the reactivity ratio will be close to unity.

The stabilizer may be formed in an organic solvent in which it is completely soluble and then added as such to organic liquid in which the dispersion of main insoluble polymer is to be formed. This organic liquid will be one of limited solubilizing power; it does not, for example, dissolve the polymer to be dispersed therein. The stabilizer is so related to this liquid, following the principles later described, that one polymeric chain of the stabilizer is solvated by the liquid and another polymeric chain of different degree of polarity is not solvated by the liquid.

If a preformed synthetic polymer which is insoluble in the organic liquid is added also as a solution to an excess of this organic liquid containing the stabilizer it is precipitated therein. This results in the formation of disperse particles of the preformed polymer associated with the non-solvated polymeric chains of the stabilizer to which are attached solvated polymeric chains. These solvated polymeric chains can stabilize not only the non-solvated polymeric chains to which they are directly attached by primary chemical bonds, but also the polymer particle with which the non-solvated polymeric chains become integrally associated during the precipitation.

Where the stabilizer is preformed, the question of which polymeric chain becomes solvated and which becomes associated integrally in the polymer particles is determined by the polarity of the organic liquid of the dispersion. As demonstrated later in an example it is possible to have a stabiliser wherein that polymeric chain which is solvated in one dispersion becomes the associated polymeric chain in another type of dispersion in another organic liquid, and vice versa.

As stated earlier the polymeric chains should have a molecular weight of at least 1,000. Preferably, the molecular weight of the chain which is to be solvated is at least 5,000 and more, preferably at least 10,000. The molecular weight of the chain which is to be non-solvated is preferably at least 2,000 and in the range 0.1 to 10 times the molecular weight of the chain which is to be solvated. Of course in a stabilizer where the roles of the polymeric chains are interchangeable it is preferred that both chains have a molecular weight of at least 10,000.

Where both types of polymeric chain in the stabilizer are vinyl chains, then either of these may be derived from the precursor, though in general it is preferred to start with a precursor containing that polymeric chain which is to be solvated in the final polymer dispersion.

Where the stabiliser is formed in situ, i.e. in the organic liquid of the dispersion this question does not arise since in that case one must start with a precursor the polymeric chains of which are solvated by the organic liquid. The vinyl chains attached thereto by the polymerization in the organic liquid must therefore be the non-solvated chains of the stabiliser which become associated with the particles of disperse polymer. In this case, the polymer chains of the precursor are again preferably at least 5,000, more preferably at least 10,000 in molecular weight. The molecular weight of the non-solvated chains will depend on the reaction conditions, but will probably be of the same order as the molecular weight of the main polymer also formed in the organic liquid. Quite satisfactory stabilisation is achieved in this way.

Alternatively, and this is a preferred form of the invention, the polymer to be stabilised may be formed in the organic liquid of the dispersion, by polymerising the main monomer dissolved therein in the presence of the stabiliser.

Usually, it is preferred that the original polymeric chains of the stabiliser are solvated by the organic liquid of the dispersion and that the vinyl chains which have been polymerised thereon are non-solvated and become associated with the disperse polymer particles. Consequently, as a further preferred development of the above alternative, as applied to dispersions of vinyl polymers, a stabiliser precursor is selected which is soluble in the organic liquid of the dispersion. On polymerisation of vinyl monomer in the organic liquid containing the precursor part of the vinyl monomer is copolymerised with the precursor to form the appropriate stabiliser; the remainder of the vinyl monomer is polymerised to polymer which, in the form of disperse particles, becomes associated with the non-solvated vinyl chains of the stabiliser. As a result, the disperse particles are stabilised by the solvated chains of the stabiliser.

This method of direct attachment of the solvatable constituents at infrequent intervals to chains of the polymer to be dispersed by primary chemical bonds results in a polymer which is self-stable and precipitates in the form of a stable dispersion. Precipitation may be concurrent with the formation of the stable polymer in a non-solvent, organic liquid or the polymer may be made in solution in a solvent for the polymer and subsequently precipitated.

The polymer dispersions of this invention are of particular value in coating compositions since they are substantially deflocculated as compared with dispersions which previously had to be made by forming a polymer in aqueous phase and then dispersing it in organic liquid. Consequently, the rheological characteristics of coating compositions based on the dispersion of the present invention are substantially improved. In addition, they provide wider ranges of particle size and molecular weight than were available by the old process, these two factors also being of particular importance in coating compositions in that together with the improved rheological characteristics they make possible the formulation of coating compositions which yield glossy pigmented films. Pigments and plasticizers may be incorporated in the coating composition in the various ways common in the art.

Further, in contrast with dispersions formed by polymerization in aqueous medium which are contaminated by conventional emulsifying and stabilizing agents, often of an ionic nature, the dispersion polymers of the present invention may contain only small amounts of compatible copolymer. They may, therefore, be precipitated, dried, or otherwise separated from the liquid phase, to produce polymers with improved physical and electrical characteristics.

To produce a dispersion, the polymer must be substantially insoluble in the organic liquid, and consequently the nature of the polymer to be dispersed determines the nature of the organic liquid. For example, where the polymer is highly polar, e.g., methyl acrylate, β-ethoxy ethyl methacrylate or acrylonitrile, the organic liquid should be non-polar, e.g., aliphatic hydrocarbon such as white spirit and iso-octane or, in conjunction with the more insoluble polymers such as acrylonitrile, aromatic hydrocarbons such as benzene. On the other hand, where the polymer is non-polar, e.g., styrene, vinyl toluene or divinyl benzene, the organic liquid should be highly polar, e.g., ethyl alcohol, methyl alcohol, ethylene glycol or acetone. Where a highly polar organic liquid is used, it may contain a minor proportion of water.

The main monomer may be a mixture of monomers or co-monomers, but for the purposes of clarity, the product of polymerising the main monomer by itself is termed a "polymer," the term "copolymer" being applied only to the product of polymerising the unsaturated groups of the precursor with vinyl monomer.

All monomers which are polymerized by a chain type polymerization of vinyl groups are suitable for use in this invention. Following the common practice in the art, such monomers are termed "vinyl monomers," it being understood that this term includes monomers which, though not of vinyl structure in the strict sense, polymerize in vinyl manner. For example, monomers which strictly are vinylidene and ethylenic monomers but which polymerize in vinyl manner are included. Doubly unsaturated monomers such as butadiene and mixtures of various monomers may be used. Typical materials which are suitable as monomers in this invention include styrene, vinyl toluene, divinyl benzene, diisopropenyl benzene, allyl acetate, diallyl adipate, acrylonitrile, vinyl chloride, vinylidene chloride, vinyl propionate, vinyl acetate, vinyl stearate and acrylates and methacrylates of aliphatic alcohols such as ethyl, octyl, lauryl and natural fat alcohols. The preferred monomers for use in the production of polymers for the preparation of coating compositions by this process are methyl methacrylate, β-ethoxy ethyl methacrylate, ethyl acrylate, vinyl acetate, acrylonitrile, methacrylic acid and acrylic acid, and the amides of these acids. Combinations of the above monomers may be used, e.g., methyl methacrylate and methacrylic acid in proportion of 90–99% and 10–1%, respectively. Other typical materials which are suitable for use as co-monomers include dimethyl itaconate, diethyl maleate, maleic anhydride, and allyl alcohol.

Solvated constituents suitable for attachment through the unsaturated groups may be for use in polar liquids, polyvinylalcohol or polymethyl methacrylate copolymerized with very small proportions of glycidyl methacrylate, and, for use in non-polar liquids, polyvinyl toluene chain-terminated with allyl alcohol and the partial stearic or behenic acid esters of higher polyols such as a short chain 1:1 copolymer of allyl alcohol and styrene. These latter constituents may be reacted with the unsaturated groups before polymerization or with reactive groups in the preformed polymer provided by the unsaturated groups.

Solvated constituents attached in this way generally should have a molecular weight of at least 1000. Using solvated constituents of less than 1000 molecular weight, it is necessary, to achieve stability, to use such a proportion that the frequency of the solvated constituents along the polymer chain may be so great as to prevent the polymer from precipitating at all. In general, the higher the molecular weight of the solvated constituents, the fewer of such constituents needed to stabilize the disperse particles of polymer.

In all cases, the organic liquid used as the polymerization and/or the dispersion medium need not necessarily be a single liquid but may well be a mixture of two or more. This may be a matter of some importance when the dispersions are to be used, for example, as coating compositions and it is desirable to be able to control the volatility of the liquid. Suitable combinations which may be used are iso-octane with high boiling petroleum fractions (paraffin), ethyl alcohol with ethylene glycol and methyl alcohol with β-ethoxy ethyl alcohol.

Also, the proportion of solvated constituents required to stabilize the dispersion will depend on the nature and molecular weight of the solvated constituents, the desired particle size, the final polymer concentration, etc.

Using the selected stabilisers or precursors as described above, stable dispersions of synthetic polymers of vary fine particle size can be obtained even when the solvated chains are present in a proportion of as low as 1% by weight of the disperse polymer. Preferably the proportion of solvated chains in the dispersion is from 3% to 10% by weight of the disperse polymer.

The precise nature of the solvatable chain will depend to a large extent on the precise nature of the organic liquid in which the main polymer is to be dispersed. Whereas the organic liquid, in order to be a non-solvent for the main polymer, will need to be of different polarity from the polymer, the solvatable chain will need to be of similar polarity to the organic liquid in order to become solvated by it.

Where the organic liquid is mainly aliphatic hydrocarbon in nature, the following are examples of suitable chains which would be solvated by the liquid:

polymers of long chain esters of acrylic or methacrylic acid, e.g. stearyl, lauryl, octyl, 2-ethyl hexyl and hexyl esters of acrylic or methacrylic acid,
polymeric vinyl esters of long chain acids, e.g. vinyl stearate,
polymeric vinyl alkyl ethers, and
polymers of ethylene, propylene, butadiene and isoprene.

Where the organic liquid is mainly armoatic hydrocarbon in nature, similar solvatable chains may be used and, in addition, shorter chain analogues, e.g. polymers of ethoxy ethyl methacrylate, methyl methacrylate and ethyl acrylate or ethyl celluloses. Other chains suitable for use in this type of organic liquid include:

aromatic polyesters, e.g. oil-modified alkyd resin,
aromatic polyethers, e.g. those sold under the trade name "Epikote,"
aromatic polycarbonates, and
polymers of styrene and vinyl toluene.

Where the organic liquid is polar in nature, i.e. methyl or ethyl alcohol, suitable solvatable chains include:

polymers of acrylic or methacrylic acid,
carboxymethyl celluloses,
polyethylene or polypropylene glycols,
hydroxylated polymers, e.g. polyvinyl alcohol or polymers of glycol mono-methacrylates.

These examples listed above are merely illustrative of the principle to be followed in selecting suitable solvated chains, i.e., that the chains must be of similar polarity to that of the organic liquid. When the polymer is formed in solution and subsequently precipitated in a non-solvent organic liquid, then again limitations are placed on the system by the fact that, in order to enter into the polymerization or modification, the solvated constituent must be soluble in the liquid in which the polymerization or modification is carried out as well as in the liquid in which the polymer is finally dispersed. The partial long chain esters of polyols are particularly suitable for this purpose. Where the polymer is formed in non-solvent organic liquid, i.e., in the liquid in which it is to be dispersed, the solvatable constituent will, as in the case of the monomer, be soluble in the organic liquid.

On the other hand, as stated above, the other polymeric chain of the stabilizer must be of different polarity so that like the polymer to be dispersed and stabilized it is insoluble in the organic liquid. Similar considerations apply therefore to this other polymeric chain and to the polymeric chains of the polymer to be stabilized in disperse form. In one embodiment of the invention in which monomer is polymerized in the organic liquid of the dispersion in the presence of the precursor to form stabilizer and disperse polymer they are of course identical.

For example, a methyl methacrylate polymeric chain would be suitable for use in an aliphatic hydrocarbon liquid, a polyacrylonitrile polymer in an aromatic hydrocarbon liquid and a polystyrene in a polar organic liquid.

These three polymeric chains are merely illustrative of a range extending from polar to non-polar. Other typical polymeric chains which may be comprised in the stabilizer or equally in the disperse polymer include polymeric chains of acrylic and methacrylic acids, esters, nitriles and amides of such acids, vinyl alcohol and derivatives such as chloride, acetate, chloracetate and stearate, vinylidene chloride, styrene and derivatives such as vinyl toluene, α-methyl styrene and divinyl benzene, butadiene and others. The polymeric chains may themselves be the product of a mixture of monomers, for example, methyl methacrylate with a minor proportion of methacrylic acid, or styrene with a minor proportion of allyl alcohol or an ester thereof.

As will be appreciated from the foregoing, the general rule is that the disperse polymer chain and the associated polymer chain of the stabilizer must not be significantly swollen by the organic liquid and broadly there are three types of systems, (1) where the polymer is insoluble because it is polar relative to the organic liquid, (2) where the polymer is insoluble because it is non-polar relative to the organic liquid, and (3) where the polymer is insoluble in all common organic liquids because of its molecular structure and irrespective of any question of relative polarity.

Systems typical of the first case are those in which the organic liquid is of a non-polar nature, the most common liquids of this type being aliphatic hydrocarbons, such as white spirit of boiling range 160–195° C. and iso-octane. With very highly polar polymers slightly more polar organic liquids, such as aromatic hydrocarbons, fatty esters and fatty ketones may be used. The organic liquid may, of course, be a mixture provided that the mixture itself is of suitable polarity relative to the polymer.

Suitable polar polymers for use in systems of the first type include esters of unsaturated acids with lower alcohols, e.g. acrylic, methacrylic, and ethacrylic acid esters of methyl, ethyl and butyl alcohols. In homopolymers of such esters butyl alcohol is the highest alcohol which can be used and preferably this ester is used as a co-monomer with a more polar monomer. Higher alcohols, e.g. octyl and lauryl, can be used provided the polymers also contain an additional polar group to compensate for the longer non-polar carbon-carbon chains. For example, the esters may be copolymerised with a minor proportion of a highly polar monomer such as acrylic or methacrylic acid. Mono-esters of glycols having a free hydroxyl group may be used, the hydroxyl group providing an additional polar effect. Alternatively, the free hydroxyl group may be esterified with a polar acid such as acetic or formic or it may be etherified with a polar alcohol such as methanol, as illustrated by, e.g., β-ethoxy ethyl methacrylate. A similar result may be achieved using as the alcohol partial esters of glycerol or its derivatives.

A further alternative is to have present in the alcohol an amino group as, for example, in methanolamines and ethanolamines, an oxane ring as in glycidyl compounds, or a free carboxylic group as in a hydroxy acid such as citric acid.

Esters of these hydroxyl-containing materials with other unsaturated acids such as maleic, fumaric and itaconic, may be used, but since such esters are difficult to homopolymerise they are best used in conjunction with a major proportion of another suitably polar monomer.

In general, it is possible to incorporate in the polymer to be dispersed a minor proportion of a comonomer which by itself would not produce a sufficiently polar polymer.

A similar type of polar polymer is produced from a monomeric ester or ether of an unsaturated lower alcohol such as vinyl alcohol.

The esters may be of hydrofluoric acid and lower acids such as acetic, chloracetic, propionic and formic. Where higher acids are used then they should also contain an additional polar group to produce a sufficiently polar polymer, for example, the acid may be a dicarboxylic acid, such as oxalic, in which the second carboxylic group is left free or is esterified with a lower alcohol such as methyl or ethyl alcohol. Alternatively, the acid may contain a hydroxyl group, e.g. lactic or citric acid, the hydroxyl group being left free or reacted, e.g. acetylated. Or the acid may contain an amino group, e.g. glycollic acid may be used, the amino group providing the additional polarity required.

Similar principles are applicable to ethers of unsaturated lower alcohols. The ether may be a simple ether of a lower alcohol such as methyl or ethyl alcohol. Alternatively, polarity may be maintained by using an ether of a di- or tri-hydroxy alcohol of which a hydroxyl group is left free, or is esterified with a lower acid such as acetic or formic or is etherified with methanol. Alternatively, the ether may be of a dimethyl ethanolamine or diethyl ethanolamine or of a glycidyl compound.

Another type of polar polymer is produced by polymerising an acid, such as acrylic or methacrylic. Alternatively, polar derivatives such as acid chlorides, amides, methylolamides, may be polymerised. Such monomers give particularly insoluble polymers and are suitable for copolymerising with monomers which, by themselves, would not produce a satisfactorily insoluble polymer.

The second type of system, makes use of polar organic liquids, such as methanol, ethanol, acetone, glycol and, in extreme cases, dimethyl formamide and methyl formate. Such polar organic liquids may contain a minor proportion of water. In this type of system the polymer is relatively non-polar.

Polymers of hydrocarbons such as styrene, vinyl toluene, divinyl benzene, di-isopropenyl benzene, isoprene, butadiene, isobutylene and ethylene, are suitably non-polar.

Other non-polar polymers are those of higher fatty esters of unsaturated acids such as acrylic, methacrylic and ethacrylic acids. In these cases, the alcohol component of the ester contains a long carbon-carbon chain to produce a polymer of suitable non-polarity. Cetyl alcohol is a typical alcohol. Lauryl alcohol is about the lowest alcohol which can be used in homopolymer esters and preferably esters of this alcohol are used as co-monomers with more non-polar monomer. In addition, one can use partial long-chain esters of a polyol, e.g. glyceryl disterate, dilaurate or di-behenate, the remaining hydroxyl of the glycerol being esterified with the unsaturated acid.

Alternatively, one can use in this second type of system higher fatty esters or ethers of unsaturated alcohols such as vinyl and allyl alcohol. Suitable acid components of such esters are stearic acid, behenic acid and monoesters of dibasic acids such as cetyl or a lauryl adipate or sebacate.

Suitable ethers are those of cetyl alcohol or of glycerol distearate, dilaurate or dibehenate.

In general, in this second type of system the disperse polymer is insoluble by reason of it containing long carbon-carbon chains.

In the third type of system, the organic liquid may be of any polarity, e.g. aliphatic hydrocarbon, benzene or ethyl acetate. In this case, the polymer is insoluble irrespective of its relative polarity. Such polymers include, for example, those of vinyl chloride, vinylidene chloride and acrylonitrile.

Clearly, the condensation reactions by means of which the necessary unsaturated groups may be attached to the polymeric chain to form the stabiliser precursor must not involve free-radicals nor any reaction similar to a vinyl polymerisation which could affect the unsaturated group. The following methods are preferred:

(i) Ester links, especially when formed by ester-interchange or by a reaction such as carboxyl/glycidyl or hydroxyl/acid chloride or hydroxyl/acid anhydride.

(ii) Ether links, especially when formed by addition reactions between alkylene oxides and hydroxyl.

(iii) Amide links, especially when formed by amine/acid chloride reaction.

(iv) Urethane links, especially when formed by reaction of isocyanate with hydroxyl groups.

The appropriate condensation link to be used to attach the unsaturated group to the polymeric chain containing esterifiable or other reactive groupings will depend on the nature of the reactive group actually incorporated into the polymer chain. Similarly, the appropriate conditions for this step will depend on the type of link being formed.

Either of the members of the link-forming pairs involved in the condensation reaction may be incorporated in the polymeric chain. With the reactive (esterifiable, etherifiable, etc.) groups incorporated, say, by suitable copolymerisation, the range of suitable systems is very large. For example, for that case where the stabiliser precursor is to be copolymerised with acrylate or methacrylate monomer to produce a stabiliser for a dispersion of acrylate or methacrylate polymer in aromatic or aliphatic hydrocarbon, one can choose combinations from among:

| Main component of polymeric chain of precursor | Copolymerised with small proportion of— | Subsequently condensed with— |
| --- | --- | --- |
| Styrene, vinyl toluene_ | Glycol monomethacrylate. | Methacryloyl chloride. |
| α-Methyl styrene_____ | Glycidyl methacrylate. | Methacrylic acid. |
| 2-ethyl hexyl acrylate_ | Methacrylic and acrylic acids. | Glycidyl methacrylate. |
| Lauryl methacrylate, etc. | Methacryloyl chloride, etc. | Glycol monomethacrylate. |

On the other hand, where the stabiliser precursor is to be used in a stabiliser for dispersions of polymers in polar liquids, the following combinations may be used. In the cases exemplified, the polymeric chain need not be a copolymer; the one monomer used contains the reactive group necessary for the condensation reaction.

| Main component of polymeric chain | Subsequently condensed with |
| --- | --- |
| Polymeric acrylic or methacrylic acid_____ | Glycidyl acrylate. |
| Polymeric glycol monomethacrylate_____ | } Acryloyl chloride. |
| Polyvinyl acetate (subsequently hydrolysed)__ | |

The proportion of polymer which may be obtained in the final polymer dispersion by this process can be varied widely, for example, within the range 5–65% of polymer solids in the final dispersion. Preferably, the dispersions have a solids content of between 25 and 50%. If higher solids content is required, it is possible to increase the solids content of a dispersion by evaporation of part of the liquid, if necessary under reduced pressure.

Dispersion of average particle sizes varying from 0.05 micron to 10.0 microns may be produced, and molecular weight of the disperse polymer may range from less than 20,000 to 1,000,000 or more.

Dispersions of polymers having a molecular weight in the range 50,000 to 250,000 are particularly suitable for use in coating compositions. In coating compositions which are to be stoved at 100–150° C., dispersions of polymers having a molecular weight of 100,000 to 250,000 are suitable. In coating compositions which are to be dried at less than 100° C., dispersions of polymers having a molecular weight of 60,000 to 100,000 are suitable.

Of particular use in coating compositions are dispersions in relatively non-polar organic liquid of polymers derived from methacrylic esters, polymers of similar polarity derived from acrylic esters, and polymers derived from vinyl acetate and vinyl chloracetate, and the highly insoluble polymers such as those of vinyl chloride, vinylidene chloride and acrylonitrile.

Suitable methacrylate ester polymers are those obtained by polymerising lower esters of methacrylic acid, e.g., methyl, ethyl, β-ethoxy ethyl and butyl esters, optionally with up to 10% of a co-monomer such as another methacrylate ester or acrylate ester or free methacrylic or acrylic acid. Synthetic polymers of similar polarity may also be obtained from lower esters of acrylic acid applying the principles explained hereinbefore. Polymers of vinyl acetate, vinyl chloracetate, vinyl chloride, vinylidene chloride and acrylonitrile and copolymers of such monomers may also be dispersed in relatively non-polar organic liquid. In such dispersions we prefer to use a stabiliser having a solvated chain of molecular weight in the range 10,000 to 100,000. Improved stability is obtained with solvated chains of molecular weight greater than 10,000 but above 100,000 any further improvement obtained may be offset by the excessive weight proportion of stabilizer required leading to the dispersion becoming thick or viscous if a high solids content is desired. An exception to this preference is the case of dispersions of the highly insoluble polymers prepared by polymerisation of vinyl chloride, vinylidene chloride, acrylonitrile and the like, in the non-solvent organic liquid in the presence of the precursor. In this case, we prefer to use a precursor having a solvated chain of molecular weight in the range 150,000 to 300,000.

Preferably, the relatively non-polar liquid comprises substantially, or to a major extent, aliphatic hydrocarbon optionally with a minor proportion of aromatic hydrocarbon.

The invention is illustrated by the following examples in which all parts are by weight.

The following Examples 1–21 illustrate the preparation of the stabiliser precursor or polymeric compound which contains the polymeric chain and unsaturated group.

*Example 1*

A mixture of 1,000 parts white spirit, 1,000 parts methyl ethyl ketone and 120 parts azodiisobutyronitrile was heated to boiling in a vessel fitted with stirrer and reflux condenser. During 2½ hours a mixture of 900 parts lauryl methacrylate and 100 parts propylene glycol monomethacrylate was added at a constant rate, and the liquid heated for a further hour to ensure complete reaction.

The reflux condenser was replaced by a take-off condenser, 1,000 parts of white spirit were added, and the mixture was distilled until the temperature of the boiling liquid reached 100° C. The residue in the vessel was filtered after cooling, yielding a 25.3% solution of polymer with a reduced viscosity of 0.042 in benzene at 25° C.

3,000 parts of the polymer solution, 300 parts methyl ethyl ketone and 167 parts of pyridine were mixed and 219 parts methacryloyl chloride added immediately afterwards with vigorous stirring. The white suspension was allowed to stand for 18 hours, then a solution of 156 parts potassium hydroxide in 400 parts water and 400 parts ethanol was slowly added with vigorous stirring. After allowing the liquids to separate, the upper layer was decanted, dried with anhydrous sodium sulphate, and filtered.

5,000 parts of ethanol were mixed with the product, to precipitate compound, and the mixture allowed to stand for 20 hours. The supernatant liquid was decanted and the oily precipitate dissolved in 1,000 parts of an aliphatic hydrocarbon fraction boiling at 70–90° C. The product was a 40% solution of the compound with an estimated molecular weight of between 10,000 and 15,000 and having 7 to 10 methacrylate groups per molecule based on 90% methacrylation.

*Example 2*

4,000 parts of an aliphatic hydrocarbon fraction boiling at 100–120° C. were heated to boiling in a vessel fitted with reflux condenser and stirrer, and a mixture of 1,960 parts lauryl methacrylate, 40 parts glycidyl methacrylate and 100 parts benzoyl peroxide paste (60% in dialkyl phthalate) was added at constant rate over 3 hours. After refluxing a further 40 minutes, 5 parts of lauryl dimethyl amine were added and the mixture refluxed for one hour longer. The resulting polymer solution was stirred with calcium oxide for one hour, allowed to stand, decanted and filtered to remove as much benzoic acid as possible. The reduced viscosity of the polymer was 0.064 in benzene at 25° C.

30 parts of methacrylic acid and 1 part of hydroquinone were added and the mixture refluxed under an atmosphere of nitrogen until the drop in acid value indicated at 65–70% of the glycidyl groups had been esterified, which took 18–20 hours. A 33.7% polymeric compound solution was obtained, having an estimated molecular weight of 18,000 and 1.7 methacrylate groups per molecule.

*Example 3*

Example 2 was repeated using a feed consisting of 1,940 parts lauryl methacrylate, 60 parts glycidyl methacrylate, and 30 parts benzoyl peroxide paste. The treatment with calcium oxide was omitted, and the reduced viscosity of the product at this stage was 0.109 in benzene at 25° C.

Esterification with 30 parts methacrylic acid was continued until the drop in acid value indicated that 25–26% of the glycidyl groups had been esterified. A 28.9% polymeric compound solution was obtained, having an estimated molecular weight of 37,000 and 2.0 methacrylate groups per molecule.

Example 4

Using the same apparatus as in Example 1, 510 parts tertiary butyl methacrylate, 2.5 parts propylene glycol monomethacrylate and 5 parts benzoyl peroxide paste were dissolved in 2,000 parts of a hydrocarbon fraction which boiled at 85° C. and refluxed for 6 hours.

The hydrocarbon fraction was then distilled off and replaced with an equal volume of a hydrocarbon fraction boiling at 165° C. until the whole mixture refluxed at 132° C., when 5 parts of maleic anhydride were added and the mixture refluxed for 4 hours.

The compound produced had an estimated molecular weight of 300,000 and 4 maleic unsaturated groups per molecule.

Example 5

Example 4 was repeated except that monomethyl itaconate was used in place of the maleic anhydride. The compound produced had an estimated molecular weight of 300,000 and 3.5 itaconate groups per molecule.

Example 6

Using the same apparatus as in Example 1, 178 parts of tertiary butyl methacrylate, 1.66 parts methacryloyl chloride and 0.83 part azodiisobutyronitrile were dissolved in 666.7 parts ethyl acetate and refluxed for 5 hours. The ethyl acetate was removed by vacuum distillation and replaced with white spirit so that the final solution contained 25% of polymer.

10 parts allylamine and 24 parts lutidine were added to the cold solution, the mixture stirred vigorously and allowed to stand overnight. The product was washed with several portions of water and then dried with 10 parts anhydrous sodium sulphate and filtered.

The product was a 25% solution of compound with an estimated molecular weight of 350,000 and 3.5 allyl groups per molecule on a basis of 50% efficiency of allylation.

Example 7

Using the same apparatus as in Example 1, 104 parts tertiary butyl methacrylate, 0.5 part ethylene glycol monomethacrylate and 1 part benzoyl peroxide paste were dissolved in 400 parts of a hydrocarbon fraction which boiled at 85° C. and refluxed for 5 hours.

200 parts of solvent were then removed by distillation and replaced by 400 parts of white spirit. The polymer solution was dried with anhydrous sodium sulphate, filtered, and heated with 40 parts allyl isocyanate in an atmosphere of nitrogen at 60° C. for 2 hours. The excess allyl isocyanate and white spirit was removed by distillation until a total of 240 parts of distillate has been collected.

The product was a 21% solution of compound with an estimated molecular weight of 260,000 and about 4 allyl groups per molecule.

Example 8

Using the same apparatus as in Example 1, 208.5 parts tertiary butyl methacrylate, 2 parts methacrylic acid and 10 parts azodiisobutyronitrile were dissolved in 1,100 parts of a hydrocarbon fraction boiling at 100–120° C. and 100 parts n-butanol, and refluxed for 4 hours. 600 parts of the solvent were then removed by distillation. 2 parts of lauryl dimethylamine and 5 parts allyl glycidyl ether were added and the mixture refluxed until the fall in acid value indicated that 25% of the acid groups had been esterified.

The product was a 24% solution of compound with an estimated molecular weight of 110,000 and 1.9 allyl groups per molecule.

Example 9

A mixture of 1,045 parts tertiary butyl methacrylate, 5 parts glycidyl methacrylate, 4000 parts distilled de-aerated water, 12 parts potassium persulphate, 30 parts sodium lauryl sulphate and 0.5 part primary octyl mercaptan were put into a vessel equipped with stirrer and thermometer, and maintained at 75° C. for 5 hours. The fine particle size dispersion formed was precipitated by addition of excess ethanol, dissolved in benzene, dried by shaking with anhydrous sodium sulphate and filtered. It was then fractionally precipitated to give fractions having a molecular weight between 500,000 and 2,000,000, as estimated by reduced viscosity measurements, and containing from about 9 to 35 glycidyl groups per molecule.

400 parts of a polymer fraction prepared as above, 5 parts methacrylic acid and 0.05 part dimethyl lauryl amine were dissolved in 800 parts of a hydrocarbon fraction boiling at 100–120° C. The mixture was refluxed in an atmosphere of nitrogen until the acid value indicated that an average of 2 glycidyl groups had been esterfied per molecule of polymer. This process was repeated for each of the fractions obtained by precipitation of the polymer.

Example 10

A mixture of 870 parts ethyl acrylate, 3 parts of hydroquinone and 375 parts of a block copolymer of propylene oxide and ethylene oxide of the type

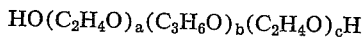

$$HO(C_2H_4O)_a(C_3H_6O)_b(C_2H_4O)_cH$$

containing 80% polyoxyethylene and 20% polyoxypropylene units by weight, based on a polyoxypropylene block of molecular weight between 1,500 and 1,800 (Pluronic F68, manufactured by Wyandotte Chemicals Corp.), was heated in a vessel fitted with a stirrer and a short packed distillation column leading to a condenser.

For a period of 2 hours, water was removed as an azeotrope with ethyl acrylate, 100 parts of total distillate being obtained. The mixture was cooled to 55° C. and 0.3 part sodium metal added. For 5 hours, a mixture of ethanol and ethyl acrylate was distilled off, 200 parts of total distillate being collected and the temperature of the refluxing liquid rising to 113° C.

Finally, for 3 hours excess ethyl acrylate was removed by distillation under a vacuum of 70 mm. mercury, the temperature being gradually raised from 50° C. to 160° C.

The compound produced was a brown waxy solid of approximate molecular weight between 7,500 and 9,000, with about 1.8 terminal acrylate groups per molecule as estimated by determination of ester value.

Example 11

A charge of 4,000 parts of 100/120° C. boiling range petroleum ether was heated to reflux in a reaction vessel equipped with stirrer and reflux condenser. A mixture of 2,000 parts 2-ethylhexyl acrylate, 60 parts glycidyl methacrylate and 12 parts azodiisobutyronitrile was fed into this reactor over three hours. Reflux was maintained for a further two hours. After this 40 parts of acrylic acid, 1 part of a commercial inhibitor known as "Topanol" A and 10 parts of lauryl dimethyl amine were added and reflux maintained for approximately a further 12 hours. At the end of this time the drop in acid value indicated that 20–25% of the glycidyl rings had been esterified.

Example 12

Example 11 above was repeated using 2,000 parts of cetyl methacrylate in place of the 2-ethylhexyl acrylate.

Example 13

Into a reactor as in Example 11 above were charged 1,500 parts of xylol, 1,000 parts of 100/120° C. boiling range petroleum ether, and the whole raised to reflux. A mixture of 1,000 parts vinyl toluene, 43 parts vinyl acetate and 5 parts of azodiisobutyronitrile were pumped into the reactor over a period of 2½ hours. Reflux was maintained for a further 2 hours and the batch cooled. A short packed fractionating column was attached to the pot; 1,000 parts of petroleum ether were distilled off and a mixture of 1,200 parts of ethyl acrylate and 5 parts of lauryl dimethylamine added. 1,000 parts of liquid comprising a mixture of ethyl acetate, ethyl acrylate and minor proportions of xylol was distilled off over a period of 4 hours. The final product had a solids content of 35%, an estimated molecular weight of 40,000 and was estimated to contain 2–3 acrylic groups per molecule of compound.

*Example 14*

2,000 parts of acetone were brought to reflux in the apparatus of Example 11 and a mixture of 1,000 parts of propylene glycol monomethacrylate and 30 parts of azodiisobutyronitrile was fed over 7½ hours, reflux was maintained for a further 3 hours before the charge cooled. This solution polymer was dried overnight over freshly baked anhydrous sodium sulphate. 14 parts of methacryloyl chloride and 15 parts of lutidine (2,6-dimethyl pyridine) were added and the whole stood in a closed vessel for 48 hours. The lutidine hydrochloride was then filtered off. The resulting compound was estimated to have a molecular weight of about 15,000 and to contain about 2 double bonds per chain.

*Example 15*

A charge of methyl methacrylate (398 parts), glycidyl methacrylate (2 parts), and ethyl acetate (800 parts) and azodiisobutyronitrile (1 part) was refluxed for 6 hours in the apparatus of Example 11. At the end of this time 600 parts of butyl acetate were added and solvent distilled off until the solids in the solution were 36%. 650 parts of this solution, 0.8 part methacrylic acid, 0.2 part hydroquinone and 2 parts of lauryl dimethylamine were maintained at reflux for approximately 10 hours. At the end of this time the drop in acid value was calculated to be equivalent to the esterification of 30% of the total glycidyl content. This compound was estimated to have a molecular weight of 250,000 and to contain about 2 methacrylate groups per chain.

*Example 16*

The first part of Example 13 was repeated but after the vinyl toluene/vinylacetate copolymer had been prepared, instead of adding the ethyl acrylate, the acetate groups in the copolymer were hydrolyzed by boiling for 18 hours with 100 parts of calcium hydroxide dissolved in 800 parts alcohol. The sludge of copolymer was fully precipitated by pouring the whole charge in a thin stream into 10 liters of methyl alcohol. The solid copolymer was separated, washed with more methanol, dried under vacuum and dissolved in 2,000 parts of pure dry toluene, to give a 28% solids solution. This solution was heated to 100° C., and 10 parts of sodium wire was then added slowly with good stirring. After 2 hours the bulk of the sodium had dissolved and the batch was cooled. A portion of approximately 1,500 parts of this solution was placed in an autoclave which was purged with dry nitrogen and then with vinyl chloride gas. The temperature was raised to 80° C. and the autoclave connected to a supply of high pressure vinyl chloride. Vinyl chloride was added until the pressure had risen to 100 lbs./sq. in. This situation was maintained for 48 hours. At the end of this time the autoclave was cooled, the excess vinyl chloride vented, and the solution of the compound removed. 10 parts of water were added and the whole stirred vigorously for 4 hours when the sodium chloride formed had aggregated to a damp, coarsely crystalline, form. The sodium chloride was filtered off and the compound was estimated to have a molecular weight of 40,000. It was not possible by this process to make an accurate determination of the number of vinyl bonds per compound molecule, but it was thought to lie between one and five.

*Example 17*

Into the reactor of Example 11 above was charged lauryl methacrylate (1,493 parts), glycidyl methacrylate (7 parts), 80–100° C. boiling range petroleum ether (1,500 parts), benzoyl peroxide (4 parts). This mixture was heated to reflux with stirring for 6 hours. Lauryl dimethylamine (5 parts) was added and heating continued for a further 1½ hours. 800 parts of odourless mineral spirits were added and solvents distilled off until the batch was refluxing at approximately 110° C. 4 parts of methacrylic acid and 1 part hydroquinone were added and the batch refluxed for approximately 20 hours. After this time the fall in acid value corresponded to between 15 and 20% esterification of the glycidyl content. The molecular weight of this compound was determined to be 450,000 and this, taken in conjunction with the above degree of esterification, corresponds to approximately 1½ methacrylate groups per polymer chain.

*Example 18*

190 parts of butyl acetate and 10 parts of ethyl acetate were refluxed and a mixture of 76 parts lauryl methacrylate, 19 parts octyl methacrylate, 5 parts glycidyl methacrylate and 1 part benzoyl peroxide paste (60 solids) was slowly added over a period of 5 hours. 0.5 part of a complex alkyl amine known as "Armeen" DMCD was added as catalyst for the subsequent esterification stage and the reflux continued for a further hour to destroy residual peroxide initiator. Molecular weight was estimated to be 75,000. 2.5 parts of acrylic acid together with a small amount (approx. 1/10 of a part) of hydroquinone were added and the charge raised to reflux. After 6 hours the acid value of the solution had dropped from 6.65–5.89 mils which corresponds approximately to the addition of 3 acrylic acid residues to each molecule. Solids were determined as 32% and the product was a clear golden syrup.

*Example 19*

A mixture of 1,000 parts commercial hexane and 2,000 parts of an aliphatic hydrocarbon mixture (boiling range 170–210° C.) was heated to reflux and over a period of 4½ hours a mixture of 1,988 parts lauryl methacrylate, 12 parts methacrylic acid, 1,000 parts commercial hexane, 5 parts azodiisobutyronitrile and 10 parts primary octyl mercaptan was added. Reflux was continued for a further 3 hours after which the molecular weight of the polymer chain was about 44,000 and the acid functionality was estimated to be about 3.

Solvent was distilled off until the batch temperature reached 120° C. when 48 parts glycidyl methacrylate and 1.8 parts "Armeen" DMCD were added. Refluxing was continued until the acid value had fallen to one third of its original figure, indicating that the polymer molecule contained on average 2 polymerisable methacrylate groups.

*Example 20*

A mixture of 165 parts commercial hexane and 332 parts of an aliphatic hydrocarbon mixture (boiling range 170–210° C.) was refluxed and a mixture of 332 parts lauryl methacrylate, 6.8 parts methacrylic acid, 158 parts commercial hexane and 0.85 part azodiisobutyronitrile was added over a period of 2 hours. Reflux was continued for 2½ hours and solvent was then distilled off until the batch temperature reached 140° C. The molecular weight of the polymer chain was then about 200,000 and on average it contained about 45 acid groups. 1.5 parts glycidyl methacrylate and 0.2 part "Armeen" DMCD were added and refluxing was continued until the acid value had fallen by 4.5% of its original value, indicating that the polymeric chain contained on average 2 polymerisable methacrylate groups.

Example 21

32 parts methyl methacrylate, 1 part glycidyl methacrylate, 67 parts ethyl acetate and 0.5 part azodiisobutyronitrile were refluxed together for 5 hours. 66 parts xylol were added and ethyl acetate distilled off until the batch temperature was 135° C. 1.0 part methacrylic acid, 0.1 part hydroquinone and 0.1 part dimethyl laurylamine were added and the mixture was refluxed for 8 hours. The molecular weight of the resulting polymer was 25,000 and it contained on average 2.2 polymerisable methacrylic groups per molecule.

The following Examples 22–65 illustrate the use of these polymeric compounds.

Example 22

A synthetic graft stabiliser was prepared by refluxing for 2 hours 200 parts of ethyl acetate, 300 parts of the precursor solution of Example 18, 97 parts methyl methacrylate, 3 parts methacrylic acid and 1 part azobisisobutyronitrile initiator. A further 1 part of initiator was then added and the charge refluxed for a further 2 hours. The molecular weight of the grafted side chains was estimated to be about 30,000 and the solids content was 31%. The stabiliser solution was an opalescent yellow syrup.

415 parts of low boiling petroleum (70–90° C.) were charged to a reactor. A mixture of 80 parts methyl methacrylate, 18 parts β-ethoxy ethyl methacrylate, 2 parts methacrylic acid, 15 parts of the stabiliser solution prepared as above, and 1½ parts of azobisisobutyronitrile initiator was then added to the reactor with continuous stirring. The charge was then raised to reflux (75° C.) and held for three hours before cooling. The product was a stable white latex.

Example 23

340 parts low boiling petroleum (70–90° C.), 100 parts white spirit, 1 part azobisisobutyronitrile initiator and 2 parts of a 10% solution of primary octyl mercaptan in white spirit were charged to a reactor. The charge was refluxed (75° C.) and a mixture of 150 parts of the stabilizer solution prepared as in the first part of Example 22, 400 parts methyl methacrylate, 90 parts β-ethoxy ethyl methacrylate, 10 parts methacrylic acid, 1 part azobisisobutyronitrile initiator and 10 parts of a 10% solution of primary octyl mercaptan in white spirit added dropwise over a period of three hours. The product was a stable white latex of 50% solids content.

Example 24

100 parts of the product of Example 3 were mixed with 65 parts of butyl acetate, 16 parts of octyl methacrylate, 10 parts of methyl methacrylate, 3 parts of methacrylic acid and 0.3 part of azodiisobutyronitrile. This mixture was refluxed for 6 hours and at the end of this time, the solids content (about 30) indicated substantially complete reaction. The molecular weight of the polymeric chains grafted onto the precursor was about 37,000.

The stabilizer solution was clear, golden oil. It was used to prepare a dispersion of a polymer as follows:

280 parts of stabilizer solution, containing approximately 15% by weight of the polylauryl methacrylate chain, were diluted with 200 parts of methyl methacrylate and 2 parts of azodiisobutyronitrile were dissolved in the mixture. This mixture was run into a mixture of 800 parts of petroleum (boiling range 70–90° C.) and 200 parts of petroleum (boiling range 140–190° C.) The polylauryl methacrylate chain of the stabilizer was solvated by this mixture of aliphatic hydrocarbons but the other polymeric chain of the stabilizer, being more polar, was not. The resultant clear solution was refluxed and after 5 minutes it became faintly turbid as the methyl methacrylate polymerized and precipitated as disperse particles of polymer. After a further 10 minutes the slow addition of a mixture of 800 parts of methyl methacrylate and 5 parts of azodiisobutyronitrile into the reflux stream was commenced. After 3 hours the addition was complete and the product was a stable, fluid, fine particle size latex of 45% solids.

Example 25

A further sample of graft stabilizer was prepared as described in the first part of Example 24, save that 30 parts of methyl methacrylate were used in place of the mixture of 16 parts of octyl methacrylate, 10 parts of methyl methacrylate and 3 parts of methacrylic acid, and the amount of initiator reduced to 0.18 part of azodiisobutyronitrile. The final product was again of about 30% solids content, but very faintly hazy. The molecular weight of the polymethyl methacrylate chains was about 40,000.

This product was used to prepare a dispersion of polymer as follows:

250 parts of the stabilizer solution were diluted with 450 parts of methyl methacrylate and 15 parts of methacrylic acid and 1½ parts of azodiisobutyronitrile added. The clear solution was run, slowly, with good stirring, into a mixture of 800 parts of petroleum (boiling range 70–90° C.) and 200 parts of petroleum (boiling range 140–190° C.). The polar polymethyl methacrylate chains of the stabilizer were not solvated by the petroleum mixture and the initial charge showed a very faint, fine particle size, haze. It was heated to reflux, and, after a few minutes, a very fine particle size white latex had formed. After 30 minutes refluxing and during a period of 2 hours a mixture of 545 parts methyl methacrylate, 10 parts methacrylic acid and 4 parts azodiisobutyronitrile were fed into the reflux stream. The batch was kept at reflux for a further 30 minutes. The final product was a stable, fluid, fine particle size latex of 47% solids.

Example 26

100 parts of the product of Example 2 were mixed with 67 parts of butyl acetate, 33 parts of methyl methacrylate and 0.5 part of azodiisobutyronitrile. The mixture was heated at 85° C. for 5 hours. The product was a faintly turbid oil. The molecular weight of the grafted chains of polymethyl methacrylate was about 20,000.

This product was used to prepare a dispersion as follows:

200 parts of the stabiliser solution were diluted with 400 parts of methyl methacrylate, 50 parts of butyl methacrylate, and 100 parts of 70–90° C. boiling range petroleum, and 2 parts of azodiisobutyronitrile were added. This solution, which was quite clear, was run into a well-stirred mixture of 200 parts of 70–90° C. boiling range petroleum and 200 parts of 140–190° C. boiling range petroleum to yield a faintly opalescent solution. This was refluxed, when it was rapidly converted to a fairly fine latex. After 30 minutes a mixture of 500 parts of methyl methacrylate, 50 parts butyl methacrylate, 1.5 parts of primary octyl mercaptan and 5 parts of azodiisobutyronitrile was fed into the reflux stream over a period of 4 hours. After a further hour at reflux temperature the product was a fluid, stable latex of approximately 50% solids and moderately fine particle size.

Example 27

A coarse particle size latex, suitable for the recovery of the polymer rather than use as a coating composition, was prepared, using the stabiliser solution of Example 26, as follows:

10 parts of the stabiliser solution were dissolved in 900 parts of methyl methacrylate, together with 0.1 part of primary octyl mercaptan and 0.3 part of azodiisobutyronitrile. This mixture was then added to 1,000 parts of 70–90° C. boiling range petroleum and heated to boiling. A strongly, but not violently, exothermic reaction occurred and in 60 minutes the monomer had all been converted to a very coarse latex. After 6 hours the polymer had settled to a firm mud of 65% solids. The petroleum was decanted and the mud allowed to dry out to yield a fine powder of polymer of particle size approximately 8.0μ and polymer molecular weight of 500,000.

*Example 28*

100 parts of the product of Example 2 were diluted with 90 parts of butyl acetate. 10 parts of methyl methacrylate and 1 part of azodiisobutyronitrile were added and the mixture refluxed for 5 hours at 85° C. The grafted polymethyl methacrylate chains had a molecular weight of 7,000. The resulting stabilizer solution was clear and was used to stabilize a polymer dispersion as follows:

54 parts of methyl methacrylate, 1 part of methacrylic acid, 2 parts of azodiisobutyronitrile and 200 parts of the above stabilizer solution were run into a mixture of 600 parts of 70–90° C. boiling range petroleum and 200 parts of 120–150° C. boiling range petroleum. This charge was heated to reflux temperature when it slowly became very faintly turbid. After 30 minutes a mixture of 500 parts methyl methacrylate, 445 parts ethyl acrylate, 10 parts methacrylic acid, 5 parts primary octyl mercaptan and 5 parts azodiisobutyronitrile, was fed into the reflux stream over a period of 3½ hours. After refluxing for another 30 minutes a fluid, stable, fine particle size latex of 49% solids was obtained.

*Example 29*

Part of the product of Example 17 was diluted with butyl acetate until the solids content was 40%. 100 parts of this solution were blended with 12 parts of methyl methacrylate, 3 parts of methacrylic acid and 0.01 part of azodiisobutyronitrile. The mixture was heated for 12 hours at 60° C. under oxygen-free nitrogen, until 70% of the monomer had polymerized, the drafted polymeric chains having a molecular weight of 150,000. The slightly hazy final product was used to stabilize a dispersion of polar polymer as follows:

300 parts of the solution of stabilizer, 30 parts of acrylonitrile, 40 parts of β-ethoxy ethyl methacrylate, 30 parts of acrylic acid, 100 parts of butyl acetate and 2 parts of azodiisobutyronitrile were added to 1200 parts of petroleum (boiling range 70–90° C.) and refluxed. A fine opalescence was formed in a few minutes. A mixture of 300 parts of acrylonitrile, 400 parts of β-ethoxy ethyl methacrylate, 300 parts of acrylic acid, 3 parts of azodiisobutyronitrile and 5 parts of thio-glycollic acid was fed into the reflux stream over a period of 3 hours. After a further 15 minutes at reflux temperature, a stable, very fine particle size, slightly thick latex of 42% solids was obtained.

*Example 30*

To the product of Example 21 were added 33 parts of lauryl methacrylate and 0.3 part of azodiisobutyronitrile and the batch heated at 85° C. under inert gas for 6 hours. (After 2 hours a further addition of 0.15 part of azodiisobutyronitrile was made.) The final product was a faintly hazy oil of 48% solids. The grafted chains of polylauryl methacrylate had a molecular weight of 25,000.

This stabilizer solution was used to prepare a dispersion as follows:

Into a mixture of 700 parts of 70–90° C. boiling range petroleum and 300 parts of 190–220° C. boiling range petroleum was run a solution of 80 parts of the above stabilizer solution, 2 parts of methacrylic acid and 1½ parts of azodiisobutyronitrile in 200 parts of methyl methacrylate. At this stage the original polymethyl methacrylate chains of the precursor were not solvated but the grafted polylauryl methacrylate chains of the stabilizer were solvated by the petroleum mixture. This initial charge was refluxed, became turbid after a few minutes and was a stable, low solids latex after 30 minutes. At this stage 800 parts of methyl methacrylate and 4 parts of azodiisobutyronitrile were slowly added over 1½ hours via the reflux condenser. After a further hour the final product was a stable, fluid, fine particle size latex of 51% solids.

*Example 31*

100 parts of the product of Example 15 were mixed with 3 parts of butyl methacrylate, 3 parts of acrylonitrile, 3 parts of methacrylic acid and 20 parts of ethanol, 20 parts of methyl isobutyl ketone and 0.01 part of azodiisobutyronitrile. The mixture was heated under inert gas for 8 hours at 75° C. to produce grafted butyl methacrylate/acrylonitrile/methacrylic acid chains of molecular weight about 100,000. The viscous, slightly hazy stabiliser solution was used to prepare a polymer dispersion as follows:

A mixture of 1000 parts ethyl acetate, 10 parts acrylic acid, 90 parts acrylonitrile, 300 parts stabiliser solution and 2 parts azodiisobutyronitrile was refluxed and after 20 minutes a fine, low solids latex had been formed. A mixture of 700 parts of acrylonitrile, 70 parts of acrylic acid, 100 parts of stabiliser solution, 1 part of thioglycollic acid, and 4 parts of azodiisobutyronitrile, were fed into the batch over 3 hours to yield a thick, stable, fine particle size latex of about 40% solids. In this case the polymethyl methacrylate chains of the stabiliser are solvated by the polar organic liquid of the dispersion and the grafted polymeric chains of the stabiliser are integrally associated with the disperse polymer particles.

*Example 32*

100 parts of the product of Example 14, 33 parts of butyl methacrylate and 2½ parts of azodiisobutyronitrile were refluxed for 6 hours to produce grafted polymeric chains of molecular weight about 15,000. The resultant hazy solution was used to prepare a dispersion as follows:

To 800 parts of benzene and 200 parts of xylol was added a mixture of 75 parts of the above stabiliser solution, 66 parts hydroxy ethyl methacrylate, 10 parts methacrylic acid, 33 parts hydroxy propyl methacrylate and 2 parts of azodiisobutyronitrile. The polybutyl methacrylate chains of the stabiliser were solvated by the aromatic hydrocarbon but the poly(propylene glycol monomethacrylate) chains were not. After 30 minutes at reflux a dilute latex had formed and into this, via the reflux stream, was fed a mixture of 400 parts hydroxy ethyl methacrylate, 200 parts hydroxy propyl methacrylate, 15 parts methacrylic acid and 6 parts azodiisobutyronitrile. After 3 hours the product was a stable, white latex of 37% solids.

*Example 33*

The stabiliser of Example 32 was also used to prepare a dispersion in an organic liquid which solvated the poly(propylene glycol monomethacrylate) chains but not the polybutyl methacrylate chains.

Into 800 parts of ethyl alcohol and 200 parts of ethylene glycol was run a mixture of 75 parts of the above stabiliser solution, 66 parts acrylonitrile, 33 parts butyl methacrylate and 2 parts azodiisobutyronitrile. The mixture was refluxed, and after a few minutes, a latex was formed. Into this was fed, via the reflux stream, a mixture of 400 parts acrylonitrile, 200 parts butyl methacrylate and 5 parts azodiisobutyronitrile. After 3 hours the product was a fine particle size latex of 38% solids.

*Example 34*

The polymeric product of Example 19 was precipitated with methanol and redissolved in standard hexane which was then largely distilled to give a solution containing 80% solids. To a refluxing mixture of 40 parts commercial hexane, 80 parts mixed aliphatic hydrocarbons (boiling range 170–210° C.) and 20 parts ethyl acetate was slowly added a mixture of 125 parts of the above solution, 40 parts hexane, 20 parts ethyl acetate, 0.375 part primary octyl mercaptan, 0.25 part azodiisobutyronitrile, 90 parts lauryl methacrylate and 10 parts methacrylic acid. The molecular weight of the grafted polymeric chains was about 40,000. This reaction produced as a stabiliser a copolymer containing polymeric chains of different polarity, the difference in polarity being due to the different methacrylic acid contents of the two types of chains.

The stabiliser was used in the preparation of a polymer dispersion. A mixture of 500 parts vinyl chloride, 128 parts of aliphatic hydrocarbon mixture (boiling range 170–210° C.) and 30 parts of a 5% solution of diisopropyl peroxy dicarbonate in the same hydrocarbon mixture was heated 50° C. As soon as whitening occurred, 167 parts of a 27% solution of the stabiliser in the hydrocarbon mixture were fed into a reaction mixture over a period of 4 hours. The reaction vessel was then vented and a stable latex was obtained.

Examples 35–65 illustrate the use of the precursors in in situ formation of stabiliser.

*Example 35*

A mixture of 63 parts of the compound solution prepared in Example 1, 30 parts methyl methacrylate, 3.5 parts azodiisobutyronitrile, 170 parts of an aliphatic hydrocarbon fraction boiling at 70–90° C., 170 parts white spirit, 100 parts of petroleum ether boiling at 40–60° C. and 10 parts acetone was placed in a vessel fitted with stirrer, sampling tube, thermometer and reflux condenser and heated to boiling point. The mixture whitened almost immediately on refluxing. After 30 minutes under reflux, 5 parts of a 10% solution of n-octyl mercaptan in white spirit were added, followed by a mixture of 475 parts methyl methacrylate, 2 parts n-octyl mercaptan and 3 parts azodiisobutyronitrile, which was added at constant rate over a total of 3 hours. The mixture was refluxed for a further 30 minutes and then cooled.

A stable latex of very fine particle size and 49% solids was obtained.

*Example 36*

Example 35 was repeated using as the initial charge a mixture of 80 parts of the compound solution prepared in Example 2, 16 parts methyl methacrylate, 18 parts ethyl acrylate, 1 part methacrylic acid, 3 parts azodiisobutyronitrile, 125 parts white spirit and 450 parts of an aliphatic hydrocarbon fraction boiling at 70–90° C. After 30 minutes under reflux a mixture of 283 parts methyl methacrylate, 315 parts ethyl acrylate, 32 parts methacrylic acid, 2.5 parts n-octyl mecaptan and 5 parts azodiisobutyronitrile was added at constant rate over 3 hours. After a further 30 minutes refluxing the mixture was cooled, yielding a fine particle size, thin, stable latex of 50% solids.

*Example 37*

Example 35 was repeated using as the initial charge a mixture of 275 parts of the compound solution prepared in Example 3, 300 parts methyl methacrylate, 4.8 parts methacrylic acid, 4 parts azodiisobutyronitrile, 295 parts white spirit and 1,340 parts of an aliphatic hydrocarbon fraction boiling at 70–90° C. After 20 minutes under reflux, 14 parts of a 10% solution of n-octyl mecaptan in white spirit were added, followed by a mixture of 1,660 parts methyl methacrylate, 34 parts methacrylic acid, 3 parts n-octyl mecaptan and 4 parts azodiisobutyronitrile, which was added at a constant rate over a total of 2½ hours. The mixture was refluxed for a further 15 minutes and cooled, yielding a very fine particle size, thin, stable latex of 52% solids.

*Example 38*

Example 37 was repeated, omitting methacrylic acid and using 1,700 parts methyl methacrylate in the feed. A fine particle size stable latex of 53.5% solids was obtained.

*Example 39*

Example 38 was repeated, using only 120 parts methyl methacrylate in the initial charge and 1,880 parts methyl methacrylate in the feed. A stable latex of 53.5% solids was obtained, intermediate in particle size between Examples 37 and 38.

*Example 40*

The compound solution prepared in Example 4 was diluted to 25% total solids with n-hexane. A mixture of 48 parts of this 25% solution, 750 parts vinyl chloride, 331 parts pure n-hexane, and 1.125 parts diisopropyl peroxy dicarbonate was put into a stainless steel autoclave equipped with a stirrer, a temperature regulating coil, thermometer and a means of adding reactants while the autoclave is under pressure.

The temperature of the charge was brought up to and maintained at 50° C. by passing hot water through the coil, and 177 parts of the 25% compound solution were added over 2 hours 40 minutes.

The excess vinyl chloride monomer was vented after 6¾ hours and the charge removed from the autoclave. The product was a fluid, fine particle size, dispersion of low viscosity and 57.9% solids, representing 93% conversion of monomer to polymer.

The K value of the polymer was 54.

*Example 41*

Example 40 was repeated using the compound prepared in Example 5, yielding a latex of substantially similar properties.

*Example 42*

Using the same apparatus and method as in Example 40, a mixture of 500 parts vinyl chloride, 440 parts n-hexane, 0.75 part diisopropyl peroxy dicarbonate, and 32 parts of 25% solution of the compound prepared in Example 5, was heated to 50° C. A further 118 parts of the compound solution were fed in over 4 hours, the temperature bing maintained at 50° C. and the unreacted vinyl chloride vented after 6¼ hours. The product was a fine particle size, thixotropic dispersion of 25.3% solids, having a polymer K value of 49.

*Example 43*

Using the same apparatus and method as in Example 40, a mixture of 500 parts vinyl chloride, 147 parts n-hexane, 0.75 part diisopropyl peroxy dicarbonate and 32 parts of the compound prepared in Example 8 (as a 25% solution) was maintained at 50° C. for 3 hours while a further 118 parts of the same compound solution were fed in. The unreacted vinyl chloride was vented after 6½ hours.

The product was a slightly thick, fine particle size dispersion of 48% solids. The K value of the polymer was 49.

*Example 44*

Example 40 was repeated using the compound prepared in Example 6, yielding a latex of substantially similar properties.

*Example 45*

Example 42 was repeated using the compound prepared in Example 7, yielding a latex of substantially similar properties.

*Example 46*

A mixture of 25 parts vinylidene chloride, 2.75 parts methyl acrylate, 19 parts n-hexane, 0.26 parts diisopropyl peroxy dicarbonate and 1 part of the compound prepared in Example 4, was placed in a stainless steel bowl which was then sealed and shaken for 5 hours at 50° C. in a thermostat bath.

A fine particle size latex of 49% solids was obtained.

Example 47

A mixture of 50 parts vinyl acetate, 90 parts of a petroleum ether fraction boiling at 73° C., 1 part azodiisobutyronitrile and 3 parts of the compound prepared in Example 4, was heated to boiling for 4 hours in a vessel equipped with stirrer and reflux condenser. A fine particle size dispersion of 34.3% solids was obtained.

Example 48

Example 47 was repeated using 50 parts of vinyl chloracetate in place of the 50 parts of vinyl acetate. A fine particle size dispersion of 33% solids resulted after 5 hours refluxing.

Example 49

The compound prepared in Example 10 was dissolved in ethanol to make a 20% solution. A mixture of 10 parts of this solution, 10 parts styrene, 31 parts ethanol, 47 parts ethylene glycol and 2 parts azodiisobutyronitrile, was heated to boiling in a vessel fitted with stirrer and reflux condenser. After 35 minutes refluxing, a mixture of 10 parts of the 20% compound solution, 60 parts styrene and 4 parts azodiisobutyronitrile was fed in at constant rate of 1¾ hours, through the condenser. After refluxing for a further hour, and cooling to room temperature, a fine particle size, slightly thick latex, of 39% solids, was obtained.

Example 50

Example 49 was repeated, replacing the 10 parts of compound solution in the feed by 8 parts of ethanol. A thinner latex was obtained, of 40% solids.

Example 51

Example 50 was repeated, replacing styrene by a mixture of styrene, ethyl acrylate, and acrylonitrile in the ratio of 65:25:10 by weight. A thin, slightly coarse latex of 36% solids was obtained.

Example 52

A mixture of 266 parts of the solution of the compound of Example 11, 300 parts methyl methacrylate, 4.8 parts methacrylic acid, 3.8 parts azodiisobutyronitrile, 300 parts of odourless mineral spirit and 1,335 parts of petroleum ether fraction, boiling between 70 and 90° C. was heated for 20 minutes under reflux. Then 15 parts of a 10% solution of n-nonyl mercaptan in white spirit were added, followed by a mixture of 1,660 parts methyl methacrylate, 34 parts of methacrylic acid, 2 parts of n-nonyl mercaptan and 4 parts of azodiisobutyronitrile which was pumped at a constant rate into a reflux stream over a period of 3 hours. The mixture was refluxed for a further 15 minutes and cooled. The final product was a stable, thin, fine particle size latex.

Example 53

Example 52 was repeated using in the initial charge 125 parts of methyl methacrylate and 255 parts of the solution of the compound as prepared in Example 12, the methacrylic acid of Example 52 being omitted. A satisfactorily stable and fine particle size latex was obtained.

Example 54

A mixture of 730 parts of a petroleum fraction boiling between 60 and 90° C., 250 parts of pure toluene, 10 parts of methacrylic acid, 90 parts of methyl methacrylate, 35 parts of the solution of the compound as prepared in Example 13 and 2 parts of azodiisobutyronitrile, was refluxed for 30 minutes. By this time a fine particle size, low solids latex, had formed. A mixture of methacrylic acid (20 parts), methyl methacrylate (280 parts), and azodiisobutyronitrile (2 parts) was fed into the returning reflux stream over a period of 2½ hours. The mixture was refluxed for a further 20 minutes and cooled to yield a fine particle size latex of approximately 40% solids.

Example 55

Example 54 was repeated except that xylene was used instead of toluene and 39 parts of the solution of the compound as prepared in Example 16 above was used instead of the solution produced in Example 13. A substantially similar result was obtained.

Example 56

A mixture of 100 parts of the product of Example 15, 850 parts of ethyl acetate, 1 part azodiisobutyronitrile and 50 parts acrylonitrile was refluxed for 1 hour. A mixture of acrylonitrile (400 parts), and azodiisobutyronitrile (3 parts) was then pumped into the batch over a period of 3 hours. The result was a fine particle size latex.

Example 57

Into a reactor equipped with a stirrer, and an up-and-over reflux condenser were charged 1,700 parts ethyl acetate and 220 parts of the solution produced in Example 15. This mixture was heated to reflux and a mixture of 110 parts of acrylic acid and 2 parts of azodiisobutyronitrile was added during 5 minutes. Reflux was maintained for 30 minutes when a further 800 parts of acrylic acid, in which were dissolved 5 parts azodiisobutyronitrile were fed over 2½ hours. The product was a stable, fine particle size, latex.

Example 58

A mixture of 142 parts of the solution produced in Example 17, 61 parts methacrylic acid, 92 parts methyl methacrylate, 280 parts of petroleum fraction boiling between 70 and 90° C., 120 parts white spirit and 1 part azodiisobutyronitrile was heated to reflux and held for 20 minutes. Then 0.3 part of primary octyl mercaptan was added and immediately after a mixture of methyl methacrylate (210 parts), methacrylic acid (140 parts), primary octyl mercaptan (1 part), and azodiisobutyronitrile (1 part) was added uniformly over 2½ hours. An extremely fine, particle size latex was obtained, the viscosity of which rose as the reaction proceeded, until the final product was a viscous syrup.

Example 59

A mixture of 80 parts of the solution of the compound as prepared in Example 12, 18 parts of methyl methacrylate, 16 parts of β-ethoxy ethyl acrylate, 1 part of methacrylic acid, 3 parts of azodiisobutyronitrile, 125 parts of odourless mineral spirit, 450 parts of an aliphatic hydrocarbon fraction boiling between 70 and 90° C. was refluxed for 30 minutes. Then a mixture of 290 parts methyl methacrylate, 300 parts of β-ethoxy ethyl methacrylate, 33 parts of acrylic acid, 2.5 parts N-octyl mercaptan, 5 parts azodiisobutyronitrile was added to the refluxing mixture at a constant rate over 3 hours. The batch was refluxed for a further 25 minutes and cooled yielding a fine particle size, stable latex.

Example 60

A mixture of 10 parts of the solution of the compound as prepared in Example 14, 4 parts of vinyl stearate, 4 parts of acrylonitrile, 2 parts of acrylamide, 40 parts of methanol, 40 parts of ethylene glycol, 2 parts of azodiisobutyronitrile, was heated to reflux. After 30 minutes reflux a mixture of vinyl stearate (28 parts), acrylonitrile (30 parts), acrylamide (2 parts), and azodiisobutyronitrile (2 parts) was added at a constant rate over 2 hours. Reflux was maintained for a further 1½ hours to yield a stable, fine particle size, latex.

Example 61

A mixture of 1,000 parts of petroleum ether boiling range 40–60° C., 150 parts of the solution of the compound as prepared in Example 17, 50 parts styrene, 150 parts acrylonitrile, 10 parts azodiisobutyronitrile and 0.3 part tertiary amyl mercaptan, was heated to reflux and maintained for 1½ hours yielding a slightly thick, rather coarse particle size latex.

Example 62

A mixture of 900 parts petroleum ether (boiling range 70–90° C.), 456 parts vinyl acetate, 123 parts stabiliser precursor solution of Example 3, 12 parts azodiisobutyronitrile and 200 parts odourless mineral spirits, was refluxed at about 75° C. for two hours. A stable, fluid, fine particle size latex of about 28% solids was produced. This was cooled to below 5° C., and a second stage of 456 parts vinyl acetate and 12 parts azodiisobutyronitrile, also pre-cooled to about 5° C., added slowly with good stirring. The batch was refluxed for 3 hours to yield a good fluid latex of 49% solids, with the polymer having a reduced viscosity in dimethyl formamide of 1.0 and the average particle size being ⅓μ.

Example 63

Example 62 was repeated save that in the initial charge, the amount of vinyl acetate monomer was reduced from 456 parts to 438 parts and, in addition, there was used 16 parts of ethyl hydrogen maleate. Similarly, in the second stage, the pre-coled feed consisted of 436 parts vinyl acetate, 19 parts ethyl hydrogen maleate and 10 parts azodiisobutyronitrile. A result substantially as in Example 62 was obtained.

Example 64

Example 62 was again repeated, save that instead of vinyl acetate, vinyl chloracetate was used. Further, the amount of initiator in both stages was reduced from 12 parts to 10 parts. The resulting latex was similar to that obtained in Example 62.

Example 65

Into a small autoclave were charged 225 parts commercial heptane, 60 parts of a 25% solution of the precursor of Example 20, 750 parts vinyl chloride monomer and 2.25 parts diisopropyl peroxy dicarbonate. The mixture was heated to 50° C. and, over a period of 100 minutes, another 90 parts of the 25% precursor solution were added. After 5 hours, the autoclave was vented and a stable latex of 30% solids was obtained.

The following Examples 66–69 illustrate the overall process:

Example 66

A compound containing a solvatable constituent and an unsaturated group was prepared as follows:

706 parts of a copolymer of styrene and allyl alchohol containing 4 units of the former and 5 units of the latter monomer per molecule was reacted at 200° C. for 2 hours with 1190 parts of a saturated $C_{22}$ acid (behenic acid) using a stream of nitrogen to remove the water formed. The oily product, which had a molecular weight estimated to be about 1700, was cooled to 80° C. and 650 parts of a high boiling petroleum ether added, followed by 308 parts of methacrylic anhydride stabilized with 0.1% of hydroquinone. The whole was maintained at 80° C. for 2 hours and then cooled. No attempt was made to remove the free methacrylic acid generated by this method of esterification.

The following four reaction mixtures were made up and cooked in 5 litre glass reactors equipped with a stirrer, heating and cooling coil, thermometer and entrance and exit leads for inert gas.

| | A | B | C | D |
|---|---|---|---|---|
| Methyl methacrylate | 1,000 | 900 | 800 | 600 |
| Compound prepared as shown above (containing approx. 75% solids) | 0 | 133 | 266 | 533 |
| White spirit | 2,000 | 1,967 | 1,934 | 1,867 |
| 60% benzoyl peroxide paste in dimethyl phthalate | 30 | 30 | 30 | 30 |

The reaction temperature was 75° C. and the total time of reaction 6 hours. The results obtained were as follows:

A. After about 30 minutes the charge became slightly hazy; at the same time hard, clear, glassy polymer was deposited in sheets over the interior of the reactor. Later, the deposited polymer became rather softer and slightly sticky.

B. After about 15–20 minutes the charge became opalescent and then gradually milky. After about 1 hour—when the disperse polymer solids were about 6%—the latex began to coarsen and it finally coagulated to large lumps of coarse fibrous polymer.

C. After 50 minutes the charge began, very slowly, to become opalescent. Gradually it changed to a white, milky liquid which, apart from some slight granular build-up on the reactor, remained stable until the end of the reaction period. The particle size as judged from turbidity measurements was about 1μ.

D. The reaction mixture remained clear throughout the cook, the only change being a slight increase in viscosity.

Example 67

The series of four reactions of Example 66 was repeated save that in each reaction the white spirit was replaced by xylene. In each case a clear copolymer solution was formed which was treated as follows:

To 1000 parts of the cooled solution (containing approximately 300 parts of polymer) was added over 15 minutes, with thorough stirring, 100 parts of odorless mineral spirits. The results obtained were as follows:

A. First precipitation occurred when 300–400 parts of petroleum spirit had been added. From the first the precipitate took the form of large floccular masses of sticky coagulated polymer.

B. First precipitation occurred when about 400 parts of petroleum spirit had been added. Coarse particles and small granules which fairly rapidly settled out, but did not coagulate further, were formed.

C. When 600 parts of precipitant had been added the mixture began to whiten and eventually a stable fine particle size milky dispersion was formed.

D. Even when the full 1000 parts of aliphatic hydrocarbon had been added, the copolymer remained completely soluble.

By way of comparison the three reactions, B, C and D of Example 66 were repeated, but using in place of the compound of Example 66, an equal weight of a 75% solution in petroleum ether of cetyl methacrylate. In this case the solvatable constituent has a molecular weight of 225 and the following results were obtained:

B. After about half an hour the reaction mixture became turbid and masses of tough, whitish polymer were deposited on the walls of the reactor.

C. After about three-quarters of an hour the reaction mixture became turbid and coagulated masses of sticky whitish polymer were deposited on the walls of the reactor and floated loose in the liquid charge.

D. After about one and a half hours the charge became slightly hazy and remained thus until the end of the cook. On standing, the reaction mixture separated into two oily layers.

Example 68

A compound containing a solvatable constituent and an unsaturated group was prepared as follows:

A mixture of 50 parts of butyl methacrylate, 150 parts of benzene, 0.7 part of benzoyl peroxide and 0.5 part of allyl alcohol was heated for 10 hours at 80° C. under reflux. The polymer was precipitated with excess methanol to free it from unreacted monomer and allyl alcohol, separated and redissolved in benzene to give a 33% solids solution. This solution was brought to reflux and a few ml. of distillate discarded to remove traces of water and methanol. 1 part of methacrylic anhydride containing 0.1 part of hydroquinone was added under reflux and the whole maintained in this condition for 3 hours.

The complex higher alkyl methacrylate solution thus formed was used to prepare a stable copolymer latex as follows:

100 parts of methyl methacrylate, 60 parts of the higher alkyl methacrylate solution (33% solids), 160 parts of white spirit, and 0.5 part of an azo catalyst known to be inefficient in the formation of graft copolymers, were heated at 80° C. for 4 hours under nitrogen. A very fine particle size latex of excellent stability was formed.

*Example 69*

A solution of a copolymer of methyl methacrylate and methacrylic acid was prepared by heating together at 70° C. under nitrogen the following reaction charge.

190 parts of methyl methacrylate, 10 parts of methacrylic acid, 2 parts of benzoyl peroxide, and 800 parts of benzene. After 6 hours, when the solids content was 20%, 40 parts of the product of esterifying 1 mol. of a copolymer of allyl alcohol and styrene (containing 5 —OH groups) with 4 mols of stearic acid (as used in Example 66) was added together with 1 part of paratoluene sulphonic acid. The system was brought to the reflux point using a Dean and Stark type of apparatus for the entrapment of the water formed. The whole was cooked for 5 hours and then cooled.

200 parts of white spirit blended with 600 parts of low boiling petroleum ether were then slowly run in with constant stirring to form a stable, fairly fine particle size, polymer dispersion of low solids. Finally 1300 parts of a mixture of benzene and petroleum ether were removed by vacuum distillation to give good concentrated latex.

What I claim is:

1. A stable dispersion in an organic liquid of particles of an addition polymer which are insoluble in the organic liquid, said dispersion being stabilized by a copolymer which is the product obtained by (i) reacting by a condensation reaction a compound (A) containing a polymeric component and a group capable of condensation reaction with a compound (B) containing both a complementary condensation reactive group and an ethylenically unsaturated group to produce a precursor (C) comprising a polymeric component having at least one such unsaturated group attached thereto and (ii) copolymerizing ethylenically unsaturated monomer (D) with the unsaturated group of precursor (C) to attach thereto, on average, not more than two addition polymeric components of (D) of different degree of polarity from the polymeric component provided by compound (A) so that one polymeric component is solvated by the organic liquid and the other polymeric component of different degree of polarity is not solvated by the organic liquid and becomes associated with the disperse polymer.

2. A stable dispersion as set forth in claim 1 in which the solvated polymeric component has a molecular weight of at least 5,000 and said polymeric component which becomes associated with the disperse polymer has a molecular weight of at least 2,000 and in the range 0.1–10 times that of said solvated polymeric component.

3. A stable dispersion as set forth in claim 2 in which said solvated polymeric component has a molecular weight of at least 10,000.

4. A stable dispersion as set forth in claim 3 in which said solvated polymeric component has a molecular weight of at least 10,000 but less than 100,000.

5. A stable dispersion as set forth in claim 3 in which both said polymeric components are vinyl polymeric chains.

6. A stable dispersion as set forth in claim 1 in which said compound (B) is selected from the group consisting of ethylenically unsaturated acids, alcohols and amides.

7. A stable dispersion as set forth in claim 1 in which said precursor (C) is an ester of a member of the group consisting of ethylenically unsaturated acids and alcohols.

8. A stable dispersion as set forth in claim 1 in which the reactivity ratio of the unsaturated group of said precursor (C) and a said ethylenically unsaturated monomer in said copolymerization does not differ from unity by more than a factor of 10.

9. A stable dispersion as set forth in claim 8 in which said ethylenically unsaturated monomer and said unsaturated group are of the same chemical type.

10. A stable dispersion as set forth in claim 1 in which said ethylenically unsaturated monomer is selected from the group consisting of vinyl chloride, vinylidene chloride and acrylonitrile and the polymeric component of said precursor (C) has a molecular weight in the range 150,000 to 250,000.

11. A process of making a stable dispersion of synthetic addition polymer in organic liquid in which the polymer is insoluble which comprises
forming disperse particles of the synthetic addition polymer in the organic liquid in the presence of a copolymer obtained by (i) reacting by a condensation reaction a compound (A) containing a polymeric component and a group capable of condensation reaction with a compound (B) containing both a complementary condensation reactive group and an ethylenically unsaturated group to produce a precursor (C) comprising a polymeric component having at least one such unsaturated group attached thereto and (ii) copolymerising ethylenically unsaturated monomer (D) with the unsaturated group of precursor (C) to attach thereto, on aveargo, not more than two addition polymeric components of (D) of different degree of polarity from the polymeric component provided by compound (A), in said copolymer one polymeric component being solvated by the organic liquid and the other polymeric component of different degree of polarity being not solvated by the organic liquid and being associated with the disperse polymer.

12. A process as set forth in claim 11 in which said polymeric solvated component has a molecular weight of at least 5,000 and said non-solvated polymeric component has a molecular weight of at least 2,000 and in the range of 0.1–10 times that of said polymeric solvated component.

13. A process as set forth in claim 12 in which said solvated polymeric component has a molecular weight of at least 10,000.

14. A process as set forth in claim 12 in which said solvated polymeric component has a molecular weight of at least 10,000 but less than 100,000.

15. A process as set forth in claim 12 in which both said solvated polymeric component and said non-solvated polymeric component are vinyl polymeric chains.

16. A process as set forth in claim 11 in which said compound (B) is selected from the group consisting of ethylenically unsaturated acids, alcohols and amides.

17. A process as set forth in claim 11 in which said precursor (C) is an ester of a member of the group consisting of ethylenically unsaturated acids and alcohols.

18. A process as set forth in claim 11 in which the reactivity ratio of the unsaturated group of said precursor (C) and said ethylenically unsaturated monomer in said copolymerization does not differ from unity by more than a factor of 10.

19. A process as set forth in claim 18 in which said ethylenically unsaturated monomer and said unsaturated group are of the same chemical type.

20. A process as set forth in claim 11 in which said ethylenically unsaturated monomer is selected from the group consisting of vinyl chloride, vinylidene chloride and acrylonitrile, and the polymeric solvated component has a molecular weight in the range 150,000 to 300,000.

21. A process as set forth in claim 11 in which the polymeric chain of said compound (A) has a molecular weight between 5,000 and 100,000.

22. A process as set forth in claim 11 in which said disperse particles of synthetic polymer are formed by polymerizing an ethylenically unsaturated monomer in said organic liquid in the presence of said copolymer, the said copolymer being preformed.

23. A process as set forth in claim 22 in which said copolymer is preformed by carrying out said copolymerization in an organic liquid in which said precursor and said copolymer are soluble.

24. A process as set forth in claim 11 in which said disperse polymer particles are formed by polymerizing an ethylenically unsaturated monomer in said organic liquid.

25. A process as set forth in claim 24 in which said disperse particles of synthetic polymer and said copolymer are formed substantially simultaneously by polymerizing ethylenically unsaturated monomer in said organic liquid and in the presence of said precursor (C).

26. A process as set forth in claim 25 in which said ethylenically unsaturated monomer is selected from the group consisting of vinyl chloride, vinylidene chloride and acrylonitrile and the polymeric chain of said precursor (C) has a molecular weight in the range 150,000 to 300,000.

27. A stable dispersion in an organic liquid of particles of an addition polymer which are insoluble in the organic liquid, said dispersion being stabilized by a copolymer which is the product obtained by (i) reacting by a condensation reaction a compound (A) containing a polymeric component of molecular weight at least 1,000 solvatable in said organic liquid and a group capable of condensation reaction with a compound (B) containing both a complementary condensation reactive group and an ethylenically unsaturated group to produce a precursor (C) comprising a solvatable component having at least one such unsaturated group attached thereto and (ii) copolymerizing ethylenically unsaturated monomer (D) with the unsaturated group of precursor (C) to attach thereto, on average, not more than two addition polymeric components of (D) of different degree of polarity from the solvatable component provided by compound (A), said polymeric component of (D) being not solvated by the organic liquid and being associated with the disperse polymer.

28. A stable dispersion as set forth in claim 27 in which said compound (B) is selected from the group consisting of ethylenically unsaturated acids, alcohols and amides.

29. A stable dispersion as set forth in claim 27 in which said precursor (C) is an ester of a member of the group consisting of ethylenically unsaturated acids and alcohols.

30. A stable dispersion as set forth in claim 27 in which the reactivity ratio of the unsaturated group of said precursor (C) and a said ethylenically unsaturated monomer in said copolymerization does not differ from unity by more than a factor of 10.

31. A stable dispersion as set forth in claim 30 in which said ethylenically unsaturated monomer and said unsaturated group are of the same chemical type.

32. A process of making a stable dispersion of synthetic addition polymer in organic liquid in which the polymer is insoluble which comprises forming disperse particles of the synthetic addition polymer in the organic liquid in the presence of a copolymer obtained by (i) reacting by a condensation reaction a compound (A) containing a polymeric component of molecular weight at least 1,000 solvatable in said organic liquid and a group capable of condensation reaction with a compound (B) containing both a complementary condensation reactive group and an ethylenically unsaturated group to produce a precursor (C) comprising a solvatable component having at least one such unsaturated group attached thereto and (ii) copolymerizing ethylenically unsaturated monomer (D) with the unsaturated group of precursor (C) to attach thereto, on average, not more than two addition polymeric components of (D) of different degree of polarity from the solvatable component provided by compound (A), said polymeric component of (D) being not solvated by the organic liquid and being associated with the disperse polymer.

33. A process as set forth in claim 32 in which said compound (B) is selected from the group consisting of ethylenically unsaturated acids, alcohols and amides.

34. A process as set forth in claim 32 in which said precursor (C) is an ester of a member of the group consisting of ethylenically unsaturated acids and alcohols.

35. A process as set forth in claim 32 in which the reactivity ratio of the unsaturated group of said precursor (C) and said ethylenically unsaturated monomer in said copolymerization does not differ from unity by more than a factor of 10.

36. A process as set forth in claim 35 in which said ethylenically unsaturated monomer and said unsaturated group are of the same chemical type.

37. A process as set forth in claim 32 in which said disperse particles of synthetic polymer are formed by polymerizing an ethylenically unsaturated monomer in said organic liquid in the presence of said copolymer, the said copolymer being preformed.

38. A process as set forth in claim 37 in which said copolymer is preformed by carrying out said copolymerization in an organic liquid in which said precursor and said copolymer are soluble.

39. A process as set forth in claim 32 in which said disperse polymer particles are formed by polymerizing an ethylenically unsaturated monomer in said organic liquid.

40. A process as set forth in claim 39 in which said disperse particles of synthetic polymer and said copolymer are formed substantially simultaneously by polymerizing ethylenically unsaturated monomer in said organic liquid and in the presence of said precursor (C).

References Cited by the Examiner

UNITED STATES PATENTS

| 2,977,334 | 3/1961 | Zopf et al. | 260—27 |
| 3,095,388 | 6/1963 | Osmond et al. | 260—4 |

MURRAY TILLMAN, *Primary Examiner.*

J. T. GOOLKASIAN, *Assistant Examiner.*